May 5, 1959 F. W. SCHONFELD ET AL 2,885,283
PLUTONIUM-ALUMINUM ALLOYS
Filed Aug. 29, 1957
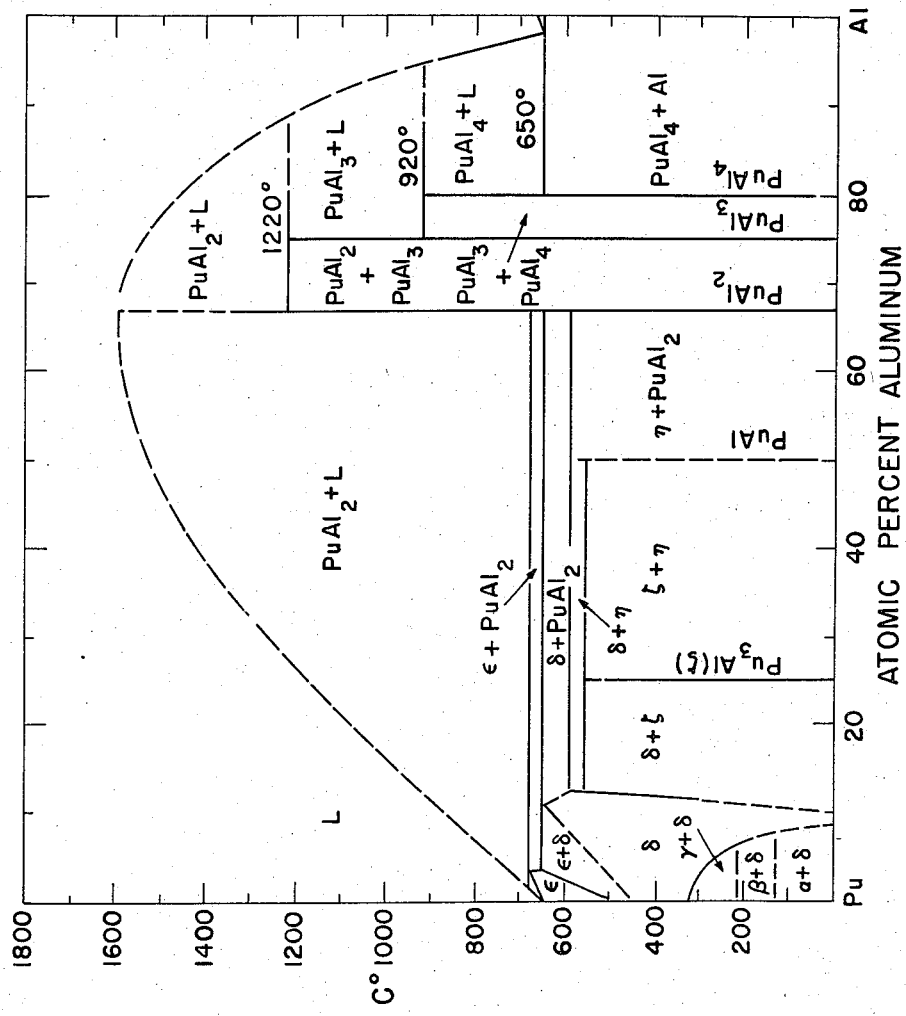
WITNESSES:
Robert D Krohn
Henry Heyman
INVENTORS
FRED W. SCHONFELD
CLYDE R. TIPTON, Jr.
BY United States Patent Office 2,885,283
Patented May 5, 1959

2,885,283
PLUTONIUM-ALUMINUM ALLOYS

Fred W. Schonfeld, Los Alamos, N. Mex., and Clyde R. Tipton, Jr., Columbus, Ohio, assignors to the United States of America as represented by the United States Atomic Energy Commission Application August 29, 1957, Serial No. 681,150

2 Claims. (Cl. 75—122.5)

The present invention relates to alloys of plutonium and more specifically to alloys of plutonium which are useful in neutronic reactors as the fuel of such reactors.

Neutronic reactors have been constructed and operated in which the fuel element has been essentially pure plutonium. For example, such a reactor is the Los Alamos fast reactor known as "Clementine." Such reactors use a fairly small volume of fuel because of the great activity of pure plutonium and consequently the heat developed is also confined to a very small volume with the attendant difficulties of removing a large quantity of heat from a small volume. (This reactor is described in the Atomic Energy Commission report LA-1679, available from the Technical Information Service, Oak Ridge, Tennessee.)

In a reactor using uranium for the fuel elements where the fuel is actually atoms of uranium of the isotope $U^{235}$, an expansion of the fuel volume is achieved by controlling the degree of enrichment of $U^{235}$ within a matrix of $U^{238}$ and this enrichment is achieved by limiting the degree of isotope separation of $U^{235}$. Since plutonium is produced as a pure material almost exclusive of any isotope other than $Pu^{239}$, this same automatic dilution is not achieved. Thus to gain the advantages of dispersed fuel it is necessary to add to the plutonium atoms some foreign element. The choice of a foreign element is not a matter which can be settled by the selection of almost any available metal because of the strict requirements which must be met for reactor use. These are:

(1) A neutronic compatibility with the system. The element must not be a strong absorber of neutrons in the energy range of the neutrons of the reactor system.

(2) It must improve the fabrication characteristics of plutonium. The element must produce an alloy which can be fabricated in the fuel elements with considerable ease.

(3) It must alloy with plutonium readily. The element must alloy with plutonium readily so that the preparation of such an alloy is a simple metallurgical step.

(4) It must improve the corrosion resistance. In most neutronic reactors, corrosion of the fuel elements is a very definite problem and since pure plutonium does not have especially good corrosion resistant properties, it is highly desirable that an alloying element improve the resistance to any type of corrosion to which the fuel element may be subjected.

(5) It must have reasonable radiation stability. As is well-known, any element subjected to a high flux of neutron and gamma rays will change its characteristics due to nuclear changes within the crystal structure of the element. Some materials exhibit a greater resistance to changes under these conditions than others.

It has been found that an alloy containing a major portion of aluminum and a minor portion of plutonium meets the above recited stringent requirements.

It is therefore an object of this invention to provide an alloy of plutonium and aluminum having good neutronic and fabrication characteristics.

Further objects of this invention will be apparent from the following description and claims and the drawing hereby made a part of this specification. The drawing shows a phase diagram of the plutonium-aluminum system.

The preferred embodiment of the present invention comprises an alloy system of plutonium and aluminum consisting of 85 to 98 atomic percent aluminum and the balance of plutonium.

PREPARATION

The alloys of the present invention are, in the preferred embodiment, prepared and cast in a vacuum. The constituents can be placed in a suitable refractory crucible in a vacuum furnace wherein a vacuum of the order of $10^{-4}$ mm. of Hg can be maintained throughout the melting and casting operations. Crucibles of magnesium oxide as produced by the method of co-pending application of Allison, Ser. No. 597,829 filed July 13, 1956 and also assigned to the United States of America as represented by the Atomic Energy Commission, can be used, for example. Before use, the crucibles are degassed at 1100 to 1200° C. to assure a high purity of the reactor fuel.

A suitable melting cycle consists of heating the alloying constituents above the melting point (as seen in the drawing) quite rapidly with an induction furnace. The molten mixture is held at this temperature for about 15 minutes and then allowed to cool at the natural rate of the furnace (approximately 5°/min.). This procedure was found to be satisfactory for the production of all alloys claimed in the present invention.

If it is desired to cast alloys in a form other than the natural shape of the crucible, they can be cast when molten or may be cooled in the crucible, remelted and cast. Best homogeneity of the alloy is obtained by chill casting, i.e., very rapid freezing by casting into a water cooled copper mold. Castability of these alloys is excellent with a shrinkage of about 5 percent. However, a cast of any selected size can be made by selecting a mold of sufficient over-size. The techniques used in casting pure aluminum are usually applicable to these alloys.

Since the alloy of the present invention is to be used in a neutronic reactor, the plutonium and aluminum used must be of sufficient purity as not to cause deleterious effects in the reactors due to impurities in themselves having poor neutronic characteristics. Analysis of plutonium and aluminum suitable for this purpose and as used in the present invention are as follows:

*Plutonium analysis*

SPECTROCHEMICAL ANALYSIS OF PLUTONIUM

| Element: | P.p.m. |
|---|---|
| C | 120 |
| Na | 6 |
| Mg | 14 |
| Al | 8 |
| Si | 15 |
| Ag | 1 |
| Pb | 15 |
| Cr | 2 |
| Mn | 50 |
| Fe | 61 |
| Ni | 20 |
| Cu | 15 |
| La | 16 |

*Aluminum analysis*

CHEMICAL ANALYSIS OF HIGH-PURITY ALUMINUM

| Element: | Weight percent |
|---|---|
| Al | 99.9968 |
| Si | 0.0011 |
| Fe | 0.0006 |
| Cu | 0.0004 |
| Mg | 0.0007 |
| Na | 0.0004 |

PROPERTIES OF THE ALLOYS

As can be seen in the phase diagram of the drawing, at 98.3 percent aluminum and the balance plutonium, a eutectic is formed having a melting point of about 647° C. To the left of this eutectic and down to 80% aluminum is a region composed of $PuAl_4 + Al$, which is the region of interest for a useful reactor alloy because of the fabrication capabilities of the alloy represented by this region. $PuAl_4 + Al$ is a good machinable alloy. The alloy containing, for example, 90% aluminum and 10% plutonium has machining qualities quite similar to gray cast iron and vastly superior to pure aluminum. This is true between 85 to 98% aluminum.

The alloy (85 to 98% Al) has advantageous characteristics for utilization in neutronic reactors in that it can be forged, cold-hammered or rolled into suitable shapes. Furthermore, the alloys of the preferred embodiment can be extruded, although more of an extrusion pressure is required than for pure aluminum.

The corrosion properties of the Al alloys of the preferred embodiment are similar to those of pure Al and are excellent. Moisture does not attack the alloy as it does pure plutonium, and the alloys are resistant to many corroding atmospheres which seriously corrode pure plutonium. The thermal conductivity is better than that of pure plutonium. Thermal conductivity is an important fact in reactor designs because the heat born within the fuel elements must be taken out quickly to accomplish the neutronic reactor's purpose of providing energy, usually in the form of heat. Therefore, an alloy to be useful must have good thermal conductivity so that the fuel elements do not melt before the heat from the nuclear reaction can be removed.

Aluminum has excellent neutronic properties and is very satisfactory in a reactor fuel alloy as an essentially inert element from a nuclear point of view. It is this excellent compatibility in a nuclear system that makes it possible to prepare a practical reactor fuel with as high as 98% aluminum present.

GENERAL CONSIDERATIONS

The alloys of the present invention contain a considerable amount of aluminum and consequently the mass of alloy required in a given neutronic reactor for the same reactivity conditions will, of course, be a great deal higher than the mass of pure plutonium. This, as has been stated, can be an advantage in reactor design primarily because the volume of material in which the heat of the reactor is born is considerably greater and it is easier to remove such heat. Furthermore, the corrosion resistance, thermal conductivity and fabricability of the alloy is better than pure plutonium. If the plutonium-aluminum alloy is used in a reactor such as "Clementine," the number of fuel rods will be increased in an amount which is determined by methods well known in the art. In that particular design the added fuel rods can be placed in a volume gained by using fewer uranium rods within the fuel cage. In any reactor it is obvious that the fuel cavity can usually be designed to accommodate the fuel volume for the plutonium-aluminum alloys without any radical change in design.

As can be seen in the phase diagram of the drawing, this specification discloses alloys of plutonium and aluminum in the rang of zero to 100% aluminum. However, as previously explained, the lowest percentage of aluminum in the aluminum rich area which may be used to produce an alloy having suitable characteristics, particularly fabrication characteristics, is 85%. It is recognized that slightly less than 85% aluminum can be used. However, the machining, casting and melting qualities of the alloy deteriorate very rapidly at less than 85%, and an alloy containing only 70% aluminum has very unfavorable chracteristics. The machining qualities of the alloy above 98% aluminum are rather excellent, although not as good as in the range of 85 to 98% aluminum. However, the purpose of this alloy as a fuel element in a neutronic reactor and a lower limitation on the amount of plutonium which keeps the alloy useful must be recognized. The lower limitation is not a sharp line wherein a tenth of a percent below is unusable, and a tenth of one percent above is usable but is rather an approximate percentage below which the amount of alloy required to fuel a reactor becomes less practical. This percentage is about 2% although it is recognized that slightly less than 2% plutonium will allow a reactor to be built. A uranium reactor, for example, may be made with 0.6% $U^{235}$.

What is claimed is:

1. An alloy consisting essentially of from 85 to 98 atomic percent aluminum and the balance plutonium.

2. A nuclear fission reactor fuel suitable for fabrication by machining, forging and rolling operations, consisting essentially of from 85 to 98 atomic percent aluminum, balance plutonium.

References Cited in the file of this patent

CF–55–7–76, AEC Document (July 20, 1955). Available from TIS, P. O. Box 1001, Oak Ridge, Tenn., @25¢.

Coffinberry et al.: "International Conference on the Peaceful Uses of Atomic Energy," vol. 9, page 142, United Nations, N.Y.